: 3,830,856
PREPARATION OF VINYLIDENE FLUORIDE

Johann Nikolaus Meussdoerffer, Blecher, and Hans Niederprum, Monheim, Rhineland, Germany, assignors to Bayer Aktiengesellschaft, Leverkusen, Germany
No Drawing. Filed Sept. 2, 1971, Ser. No. 177,443
Claims priority, application Germany, Sept. 8, 1970,
P 20 44 370.3
Int. Cl. C07c 17/34
U.S. Cl. 260—653.5      7 Claims

ABSTRACT OF THE DISCLOSURE

In the pyrolysis of 1,1-difluoro-1-chloroethane to produce 1,1-difluoro-ethylene, the improvement which comprises effecting the pyrolysis on the presence of water. Preferably the reaction is effected in a corrosion-resistant reaction tube filled with a catalytically-active carrier material, the residence time therein ranging from about 1 to 15 seconds. The amount of water is preferably about 20 to 50 mole percent that of the 1,1-difluoro-1-chloroethane. The pressure may be reduced and the temperature is preferably about 500 to 650° C. In this manner high conversions and almost quantitative yields are achieved.

---

The present invention relates to a process for the preparation of vinylidene fluoride, $CF_2=CH_2$, by selective pyroylsis of 1,1-difluoro-1-chloroethane.

It is known that a number of fluoro-olefins can be prepared from fluorinated alkanes containing other halogen atoms by removal of such other halogen atoms by means of metallic reducing agents in anhydrous polar solvents. this reaction, however, occurs only with great difficulty in the case of compounds with a difluorochloromethyl group and has, therefore, not become important for the industrial preparation of vinylidene fluoride from 1,1-difluoro-1-chloroethane (Houben Weyl, Methoden der Org. Chemie, 5/3, p. 377).

The reduction of fluorochloroalkanes by hydrogen for the preparation of vinylidene fluoride is known only from 1,1-difluoro-1,2-dichloroethane. This reaction is only possible on nickel catalysts at very high temperatures and results, owing to side reactions, only in small yields of vinylidene fluoride (U.S. Pat. No. 2,734,090).

Finally, the dehydrochlorination of 1,1-difluoro-1-chloroethane with bases has been described. This reaction also however has no industrial importance for the preparation of vinylidene fluoride because of the small conversions and yields. (Houben Weyl, Methoden der Org. Chemie, 5/3, p. 384).

At present, the most important process for the preparation of fluorolefins and that most widely used on an industrial scale is the pyrolytic dehydrochlorination of the corresponding chlorofluoroalkane (DRP 761,526). Vinylidene fluoride is produced on pyrolysis of 1,1-difluoro-1-chloroethane, preferably carried out in the presence of catalysts such as nickel or copper, although the product is heavly contaminated with by-products such as 1-chloro-1-fluoroethylene ($CFCl=CH_2$) and 1,1,1-trifluoroethane ($CF_3—CH_3$), which are produced at the necessarily high temperature in side reactions by dehydrofluorination of the 1,1-difluoro-1-chloroethane and by further addition of the hydrogen fluoride formed to the vinylidene fluoride already produced (U.K. Pat. No. 823,998).

Considerable improvement of this reaction in regard to the yield of vinylidene fluoride was first achieved by the addition of chlorine to the 1,1-difluoro-1-chloroethane (German Auslegeschrift No. 1 253 702), but this process also has various disadvantages. Besides corrosion problems and the relatively low degree of reaction in the conversion of 1,1-difluoro-1-chlorethane to 1,1-difluoroethylene, even with very high residence times, the addition of chlorine produces considerable amounts of 1,1-difluoro-2-chloroethylene, which greatly interferes in the polymerization of vinylidene fluoride and is difficult to remove:

(a) $CF_2Cl—CH_3 \rightarrow CF_2=CH_2+HCl$
(b) $CF_2=CH_2+Cl_2 \rightarrow CF_2Cl—CH_2Cl$
(c) $CF_2Cl—CH_2Cl \rightarrow CF_2=CHCl+HCl$ It is accordingly an object of the present invention to provide a process for producing vinylidene fluoride economically and in high yield.

This and other objects and advantages are realized in accordance with the present invention wherein there is provided a process for the preparation of 1,1-difluoroethylene by pyrolysis of 1,1-difluoro-1-chloroethane, optionally in the presence of a catalyst, characterized in that the 1,1-difluoro-1-chloroethane is pyrolyzed in the presence of water.

It was surprising to find that the pyrolysis of 1,1-difluoro-1-chloroethane to give excellent yields of vinylidene fluoride is possible in the presence of water without hydrolysis of the trihalomethyl groups which are normally very sensistive to water (Handbuch der Kaltetechnik, Vol. IV, Die Kaltemittel, Springer, 1956, pp. 373, 345 to 348).

Hitherto, a catalytic effect of water has only been observed in the intermolecular dehydrochlorination of difluorochloromethane $CF_2ClH$ to give tetrafluoroethylene $CF_2=CF_2$ by pyrolysis (German Auslegeschrift 1,073,475):

$$2\ CF_2ClH \rightarrow CF_2=CF_2 + 2\ HCl$$

It was, therefore, all the more surprising that in the pyrolysis of 1,1-difluoro-1-chloroethane in the presence of water, in the first place no hydrolysis of the difluorochloromethyl group occurred and in the second place that only a selective intramolecular dehydrochlorination took place with formation of vinylidene fluoride.

The starting product 1,1-difluoro-1-chloroethane is easily available and can be prepared in the following ways:

(1) Reaction of 1,1,1 - trichloroethane (methylchloroform) with hydrofluoric acid:

$$CCl_3—CH_3 + 2HF \rightarrow CF_2Cl—CH_3 + 2HCl$$

(2) Reaction of vinylidene chloride with hydrofluoric acid:

$$CCl_2=CH_2 + 2HF \rightarrow CF_2Cl—CH_3 + HCl$$

(3) Addition of hydrogen fluoride to acetylene to give 1,1-difluoroethane followed by chlorination to give 1,1-difluoro-1-chloroethane:

$$CH\equiv CH + 2HF \rightarrow CF_2H—CH_3$$

$$CF_2H—CH_3 + Cl_2 \rightarrow CF_2Cl—CH_3 + HCl$$

The vinylidene fluoride which can be prepared in accordance with the invention in high yields and in very pure form is an industrially important monomer which can be converted to interesting homo- and co-polymers and can also be used as an intermediate in many organic reactions. In particular, the thermoplastic fluoro-plastic polyvinylidene fluoride is achieving growing industrial importance especially for corrosion-resistant coatings and weather-resistant paints.

The process according to the invention can be carried out in such a way that 1,1-difluoro-1-chloroethane is led, at the same time as water, preferably in the form of steam, through the reactor heated to the required reaction temperature using normal or reduced pressures preferably down to about 100 mm./Hg. The concentration of the water is between about 0.5 and 75, preferably between about 20 and 50 mole percent. The reaction residence time, i.e. the time spent in the reactor, should be about 0.1 to 60, preferably about 1 to 15 seconds. The reactor is preferably made of nickel but copper can also be used. It has also proved to be advantageous for the reactor to contain fillers which increase the surface area and which are stable under the reaction condition, such as nickel fillings, copper fillings, Raschig rings of resistant material such as Carborundum, quartz or graphite, etc. By this means, thorough intermixing of steam and 1,1-difluoro-1-chloroethane is achieved and a more uniform temperature of the gas mixture over the cross-sectional area of the reaction tube is obtained owing to the better thermal conductivity properties; possible catalytic effects can also not be excluded.

The reactor can be heated externally to the required reaction temperatures of about 400 to 700° C., preferably about 500 to 650° C.; however direct heating with an oxyhydrogen flame is also possible, by which means the required amounts of steam are introduced at the same time. The reaction product is recovered in the usual way in that the aqueous hydrochloric acid is first removed, the residual gases are dried, freed from entrained hydrochloric acid by means of bases and then condensed. Unreacted 1,1-difluoro-1-chloroethane can now, after separation, for example by fractional distillation, be recycled to the reactor and again subjected to pyrolysis.

The process according to the invention is illustrated below in greater detail by means of the following examples:

Example 1

123.5 g. (=1.2 mole of $CF_2ClCH_3$ together with 7 g. of $H_2O$ (=0.39 mole) were pyrolyzed for an hour at 550° C. in a nickel tube in which the residence time was 10 seconds. The composition of the product was as follows:

47.95% $CF_2=CH_2$
51.35% $CF_2Cl-CH_3$
0.45% $CFCl=CH_2$

This corresponds to a conversion of about 48% $CF_2Cl-CH_3$ of which >98% was converted to $CF_2=CH_2$.

Example 2

117 g. (=1.1 mole) of $CF_2Cl-CH_3$ together with 6.7 g. (0.37 mole) of $H_2O$ were pyrolyzed for an hour at a temperature of 600° C. and a residence time of 10 seconds in a copper reaction tube filled with nickel fillings. The reaction product had the following composition:

86.2% $CF_2=CH_2$
12.4% $CF_2Cl-CH_3$
1.0% $CFCl=CH_2$

This corresponds to a conversion of the $CF_2Cl-CH_3$ of about 88% of which >98% was converted to $CF_2=CH_2$.

Example 3

77.5 g. (0.77 mole) of $CF_2Cl-CH_3$ together with 14 g. (0.77 mole) of $H_2O$ were pyrolyzed for an hour with a residence time of 10 seconds, and a temperature of 600° C. in a nickel reaction tube filled with Carborundum Raschig rings. A product of the following composition was obtained:

66.6% $CF_2=CH_2$
31.8% $CF_2Cl-CH_3$
0.4% $CFCl=CH_2$

This corresponds to a conversion of 68.2% of which 97.7% was converted to $CF_2=CH_2$.

It will be appreciated that the instant specification and examples are set forth by way of illustration and not limitation and that various modifications and changes may be made without departing from the spirit and scope of the present invention.

What is claimed is:

1. In the pyrolysis of 1,1-difluoro-1-chloroethane to produce 1,1-difluoro-ethylene, the improvement which comprises effecting the pyrolysis in the presence of about 0.5 to 75 mole percent at a temperature of about 400 to 700° C. of water.

2. The process of claim 1, wherein the pyrolysis is effected at a temperature of about 500 to 650° C.

3. The process of claim 1, wherein the pyrolysis is effected in the presence of about 20 to 50 mole percent of water.

4. The process of claim 1, wherein the pyrolysis is effected at reduced pressure.

5. The process of claim 1, wherein the residence time of the 1,1-difluoro-1-chloroethane at pyrolysis temperature is about 0.1 to 60 seconds.

6. The process of claim 1, wherein the residence time of the 1,1-difluoro-1-chloroethane at pyrolysis temperature is about 1 to 15 seconds.

7. The process of claim 2, wherein the pyrolysis is effected at reduced presure in the presence of about 20 to 50 mole percent of water in a corrosion-resistant reaction tube filled with a material selected from the group consisting of nickel, copper, Carborundum, quartz and graphite, the residence time in said reaction tube ranging from about 1 to 15 seconds.

References Cited

UNITED STATES PATENTS

| | | | |
|---|---|---|---|
| 2,551,573 | 5/1951 | Downing et al. | 260—653.5 |
| 2,478,933 | 8/1949 | Bratton et al. | 260—653.5 |
| 3,308,174 | 3/1967 | Edwards et al. | 260—653.5 |

DANIEL D. HORWITZ, Primary Examiner